United States Patent

Macken et al.

Patent Number: 5,764,843
Date of Patent: Jun. 9, 1998

[54] OPTICAL FIBRE ORGANIZER

[75] Inventors: Luk Jozef Macken, Antwerpn; Lodewijk Cordula Michael Van Noten, Louvain, both of Belgium

[73] Assignee: N.V. Raychem S.A., Kessel-Lo, Belgium

[21] Appl. No.: 612,938

[22] PCT Filed: Sep. 2, 1994

[86] PCT No.: PCT/GB94/01909

§ 371 Date: Mar. 6, 1996

§ 102(e) Date: Mar. 6, 1996

[87] PCT Pub. No.: WO95/07482

PCT Pub. Date: Mar. 16, 1995

[30] Foreign Application Priority Data

Sep. 8, 1993 [GB] United Kingdom ............... 9318602

[51] Int. Cl.⁶ ........................................... G02B 6/36
[52] U.S. Cl. ........................................... 385/135
[58] Field of Search .............................. 385/134, 135

[56] References Cited

U.S. PATENT DOCUMENTS

| | | | |
|---|---|---|---|
| 4,627,686 | 12/1986 | Szentesi | 385/135 |
| 4,840,449 | 6/1989 | Ghandeharizadeh | 385/135 |
| 4,886,336 | 12/1989 | Deusser et al. | 385/135 |
| 4,911,521 | 3/1990 | Ryuto et al. | 385/135 |
| 5,013,121 | 5/1991 | Anton et al. | 385/135 |
| 5,167,001 | 11/1992 | Debortoli | 385/135 |
| 5,206,927 | 4/1993 | Finzel et al. | 385/135 |

FOREIGN PATENT DOCUMENTS

| | | | |
|---|---|---|---|
| 0434530 | 6/1991 | European Pat. Off. | |
| 0593927 | 4/1994 | European Pat. Off. | |
| 2 573 544 | 5/1986 | France | 385/135 |
| 2577688 | 8/1986 | France. | |
| 4030310 | 3/1992 | Germany. | |
| 60-196704 | 10/1985 | Japan | 385/135 |
| WO 90 12334 | 10/1990 | WIPO. | |
| WO 90/15351 | 12/1990 | WIPO | 385/135 |
| WO 91 10927 | 7/1991 | WIPO. | |
| WO 92/22842 | 12/1992 | WIPO | 385/135 |

*Primary Examiner*—John Ngo
*Attorney, Agent, or Firm*—Herbert G. Burkard

[57] ABSTRACT

An optical fibre organizer, which comprises:
1. a plurality of inlet ports through which optical fibers can pass;
2. an outlet port through which optical fibers can pass;
3. an organizer drum positioned with respect to the ports such that fibers passing from the inlet ports to the outlet port are constrained by an outer surface of the drum to a minimum bend radius at least equal to the critical bend radius of the fibers;

in which each inlet port has bend control means adjacent thereto to direct a fibre passing through that port towards the surface of the drum at a minimum bend radius at least equal to the critical bend radius of that fiber.

10 Claims, 9 Drawing Sheets

OPTICAL FIBRE ORGANIZER

BACKGROUND OF INVENTION

The present invention relates to various components for use in an optical fibre network, in particular for splicing, terminating and splicing.

Optical fibres are in general very small, brittle and therefore easily damaged and as a result great care must be taken in their installation and use. In order to avoid damage and light loss, a fibre must not be bent excessively and it must not be subject to unfavourable environmental conditions. As is well know, each fibre has a so-called critical bend radius below which light will be lost from the fibre. Therefore, an optical fibre system must be so configured that none of its fibres is bent at a bend radius below this critical value. Also, fibres must not be even temporarily bent during installation below a smaller bend radius at which permanent damage will occur. These requirements put constraints on the design of components for optical fibre networks.

The components in an optical fibre system are required to organize cables and their component optical fibres at, for example, cable terminations, cable splices and fibre splitters. This involves careful fibre routing, for example to allow easy access to each of many fibre splices, and storage of spare lengths of fibre.

Many proposals have been made to satisfy these requirements. For example, U.S. Pat. No. 4,840,449 (AT&T) discloses an optical fibre organizer and splicing arrangement that permits storage of variable lengths of surplus fibre. The organizer has a pair of separated cylinders extending from a first rectangular section of a base plate and a splice tray having opposite entrance sides for optical fibre in a second rectangular section. The surplus fibre is directed around one or both cylinders and underneath the splicing tray through a plurality of different length passageways so that the varying lengths of optical fibre are stored. Clockwise, counter-clockwise and FIG. 8 loops are used so that each optical fibre end is directed to a predetermined entrance side of the splicing tray without violating the fibre bend radius restriction.

U.S. Pat. No. 4,627,686 (Siecor) discloses asplicing tray for optical fibres and optical fibre cables comprising three elements: a base, a number of optical fibre storage means associated with the base and an optical fibre receiving means attached to the base. Around the periphery of the base is a plurality of upstanding sidewall members, the terminal portion of which is curved inwardly towards the centre of the base.

SUMMARY OF THE INVENTION

We have now designed an organizer which is able to deal with a plurality of inputs and is able to store various fibres in a readily accessible way.

Thus, the present invention provides an optical fibre organizer which comprises:

1. a plurality of inlet ports through which optical fibres can pass;
2. an outlet port through which optical fibres can pass;
3. an organizer drum positioned with respect to the ports such that fibres passing from the inlet ports to the outlet port are constrained by an outer surface of the drum to a minimum bend radius at least equal to the critical bend radius of the fibres;

in which each inlet port has bend control means adjacent thereto to direct a fibre passing through that port towards the surface of the drum at a minimum bend radius at least equal to the critical bend radius of that fibre.

We prefer that the drum be substantially cylindrical, preferably of substantially circular cross-section. It may, however, vary in size or shape along its length. For example it may be waisted in order to locate fibre at some position along its length. More than one drum may be provided in order to give greater flexibility to the lengths of fibre that can be stored. Two drums, for example, allow fibre to be wrapped either around one drum only, around both drums without cross-over, or around both drums in a figure of eight configuration. The drums need not be made of sheet material and may instead comprise a frame: references to the shape of the drums refer to their envelope, as would be followed by a fibre wrapped around them.

We prefer that the outlet port be provided at an opposite edge portion of the organizer to the inlet ports, in particular, we prefer that two outlet ports be provided one at each side of the organizer at an edge portion of the organizer opposite to that of the inlet ports. The inlet ports are preferably arranged in a row extending across the width of the organizer from one side to the other. Two drums are preferably provided, side-by-side, between the row of inlet ports and the two outlet ports. The number of inlet ports in the row will depend on the fibre network, but we prefer that there be at least four, more preferably at least 8, preferably from 20 to 60 for example about 36.

The several bend control means preferably comprise substantially mutually concentric curved walls, which may be substantially continuous along their length, but may instead comprise a series of posts etc. These curved walls may be provided in two groups those at one side of the organizer being curved in one direction (preferably towards that side) and those at the other side of the organizer being curved in an opposite direction (preferably towards that side of the organizer). This arrangement will be particularly preferred when the organizer has reflectional symmetry about a plane between two organizer drums.

The device defined above may be usefully used to organize fibres leaving one or more cables before those fibres are directed to splicing or splitting trays. Thus, the organizer preferably additionally comprises:

4. at least one organizer tray which is fed by fibres from the inlet or outlet, preferably outlet, ports.

The organizer is preferably of unitary construction and may conveniently be moulded from a suitable plastics material.

BRIEF DESCRIPTION OF THE DRAWINGS

The invention is further illustrated with respect to the accompanying drawings, in which.

DESCRIPTION OF THE PREFERRED EMBODIMENTS

Figure 1:
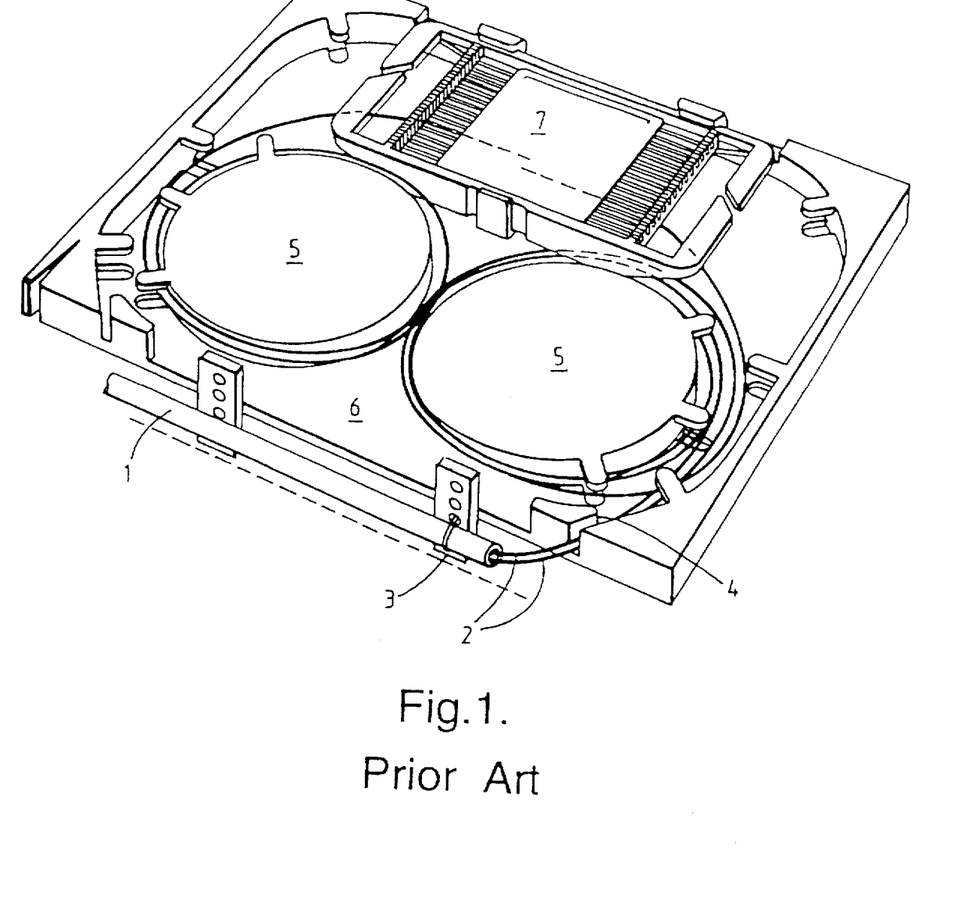
FIGS. 1 and 2 show prior art optical fibre organizers.

FIG. 1 shows a prior art optical fibre organizer as disclosed in U.S. Pat. No. 4,840,449 (AT&T). An optical fibre cable 1 containing optical fibres 2 is secured to an optical fibre organizer by means of a cable tying post 3. The fibres pass through an inlet port 4 and are stored around drums 5 protruding from a face 6. The optical fibres pass under a splicing tray 7 where a splice between them is secured. It may be noted that there is no means for individually organizing a plurality of incoming cables or fibres, there is no way of dealing with dark fibre, and only cables entering in the plane of the face 6 can be dealt with.

Figure 2:
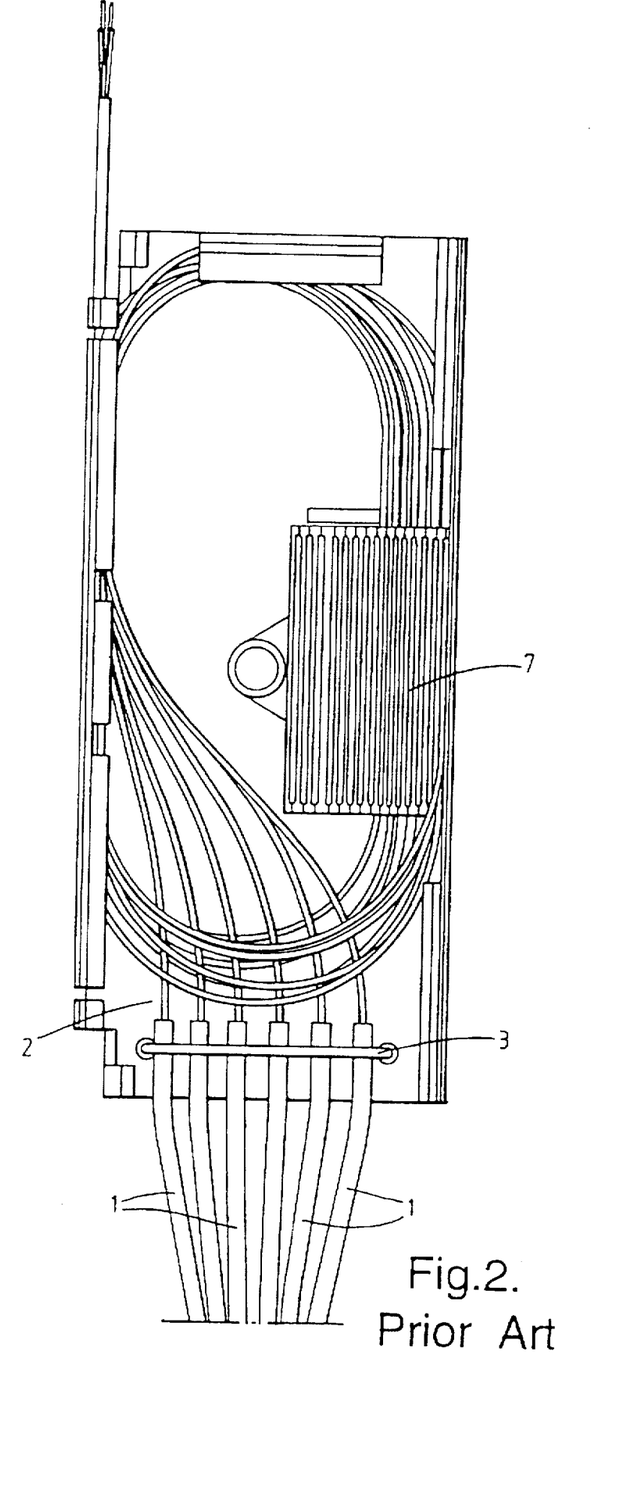

A prior art optical fibre organizer disclosed in U.S. Pat. No. 4,627,686(Siecor) is shown in FIG. 2. Here incoming cables 1 are arranged side-by-side and the fibres 2 they contain are simply routed around the base of the organizer and are retained by its side walls. The cables are held in place by a clamp 3. A fibre receiving means 7 comprises a series of slots which can retain fibre splices for connection to the outgoing cable shown at the top left of the figure. Although this design allows several incoming cables 1 to be terminated the design allows little flexibility in routing or storage.

Figure 3:
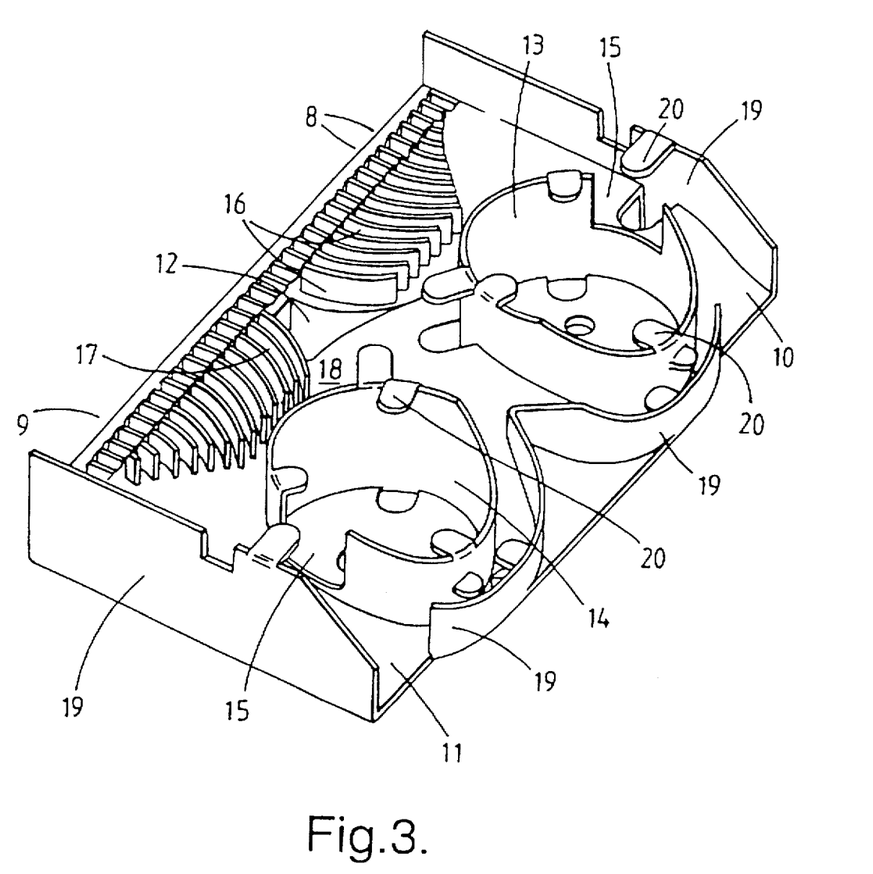
FIG. 3 is a perspective view of an organizer of the invention.

FIG. 3 shows an optical fibre organizer having a first face partially bound by first (top-left as drawn) and second (lower right as drawn) opposite edge portions, a first face:

(1) bearing a plurality of inlet ports 8, 9 arranged along the first edge portion;

(2) bearing an outlet port 10, 11 at each side of the second edge portion;

(3) bearing two organizer drums 13, 14 positioned between the first and second edge portions; and (4) having a through port 12 that extends through it to an opposite face of the organizer;

the inlet ports 8, 9 comprising a row of slots for receipt of fibre tube terminating devices (preferably the fibre break-out devices of FIGS. 6A to E) and a series of curved walls 16, 17 for constraining fibres leaving said tubes to a minimum bend radius equal to at least the critical bend radius of the fibre.

(These slots may conveniently be referred to as ports since their function is to locate incoming fibres; it should be noted however that the fibres do not pass through the slots.)

The drums 14, 15 are preferably such that a fibre passing between any of the walls 16, 17 and the outlet ports 10, 11 is constrained by an outer surface of one or both drums 13, 14 to a minimum bend radius at least equal to the critical bend radius of the fibre, the drums 13, 14 preferably being hollow allowing a free end of fibre to pass from one of the ports, generally one of the inlet ports 8, 9, to the interior of the drums. The fibres will be stored in the drums at a minimum bend radius greater than that at which they suffer permanent damage. This minimum bend radius may be larger than the critical bend radius of the fibre since it is permanent damage rather than light loss that is of concern in the case of the dark fibre.

The through port 12 extends from a convex portion 18 of the face of the organizer at an angle to its radius vector at that portion (i.e. not radially and preferably close to tangentially) such that a fibre extending through the port 12 and over convex surface 18 is constrained to a minimum bend radius at least equal to its critical bend radius.

The organizer preferably has side walls or other retaining means 19 and the drums preferably have hooks or other retaining means 20 that help guide the fibres.

Figure 4A:
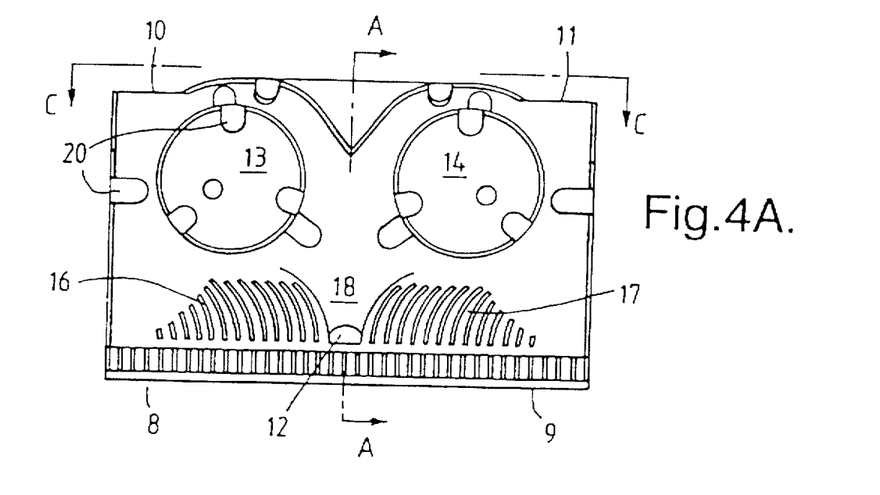
FIGS. 4A to E show various other views of the organizer.
Figure 4B:
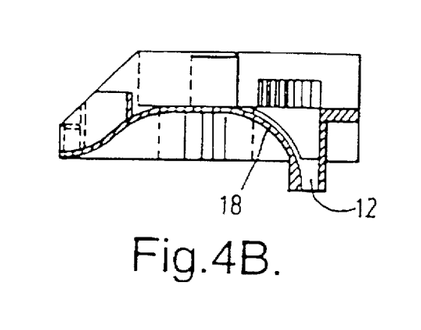
Figure 4C:
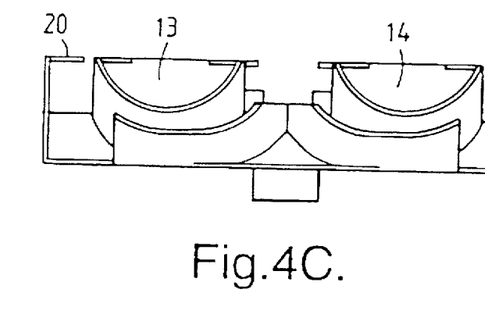
Figure 4D:
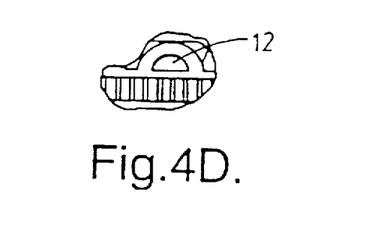
Figure 4E:
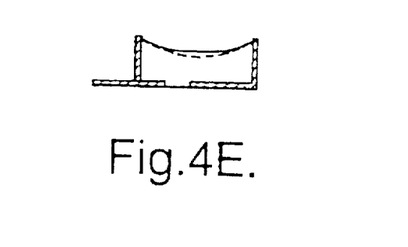

Further views of the organizer can be seen in FIGS. 4A to 4E. In FIG. 4A for example it can be seen that walls 12A of the through port 12 curve along a path towards the drums 13, 14. This curvature may result from a progressive broadening of the cross-sectional size of the through port 12 towards the face illustrated in FIG. 4A. As a result, the through port 12 includes a substantially straight passage from one face to the opposite face allowing easy insertion of optical fibres. This can be seen best, perhaps, in FIG. 4B. It can be seen therefore that a fibre passing through the through hole 12 towards the drums 13, 14 is constrained to a given minimum bend radius.

The drums 13, 14 can be seen, particularly from FIG. 3, to be hollow thus allowing a free end of fibre to pass from one of the ports to the interior of the drums where it can be stored. The hollow drums have slots 15 in their walls through which such fibre can pass.

The inlet ports 8, 9 can be seen to have bend control means in the form of substantially mutually concentric curved walls 16, 17. The organizer shown has reflective symmetry about line AA and as a result the bend control means are arranged in two groups 16, 17, where the walls curve in opposite directions.

Figure 5A:
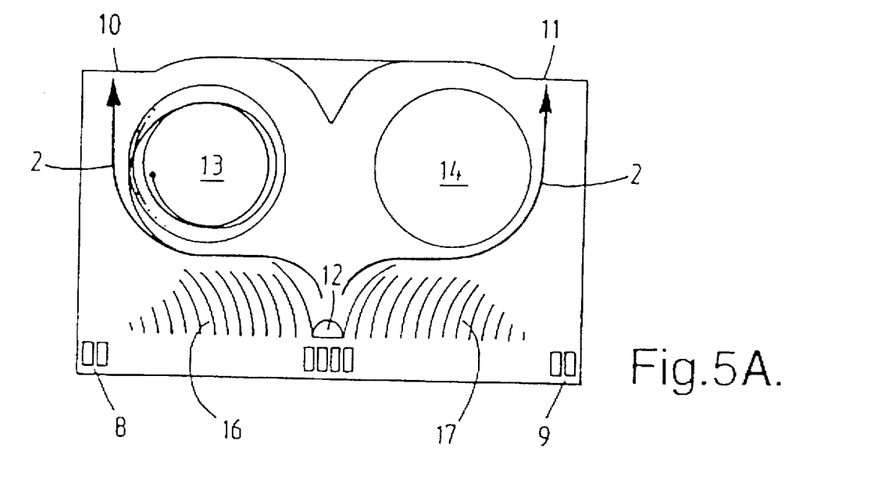
FIGS. 5A to E show various fibre routes through the organizer.

FIGS. 5A to E show the flexibility of the organizer in accommodating various configurations and lengths of fibre. In FIG. 5A fibre enters the organizer from through hole 12 and leaves through outlets 10 and 11. Also, some dark fibre leaves through hole 12 and is stored in drum 13. The organizer here is intended to be used with other components such as optical fibre splice trays accommodating fibre splices and/or fibre splitters. The organizer will be aligned with a base plate carrying such trays, on the right-hand side of which there may be a channel for accommodating fibres entering the splice trays, and on the left-hand side of which there may be a channel accommodating fibres leaving the splice trays. These passages may be referred to arbitrarily as an in trench and an out trench, although this is not intended to imply any direction of light travel.

Figure 5B:
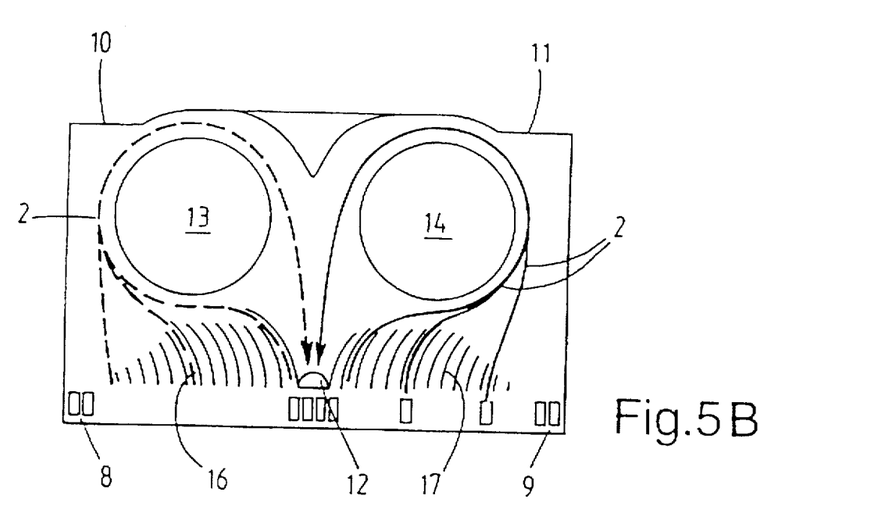

In FIG. 5B fibres enter through inlet ports 8 (only a few of which are shown), pass through bend control means 16 and leave the organizer via through hole 12. Also, fibres enter through inlet ports 9, pass through bend control means 17 and exit again via through hole 12.

Figure 5C:
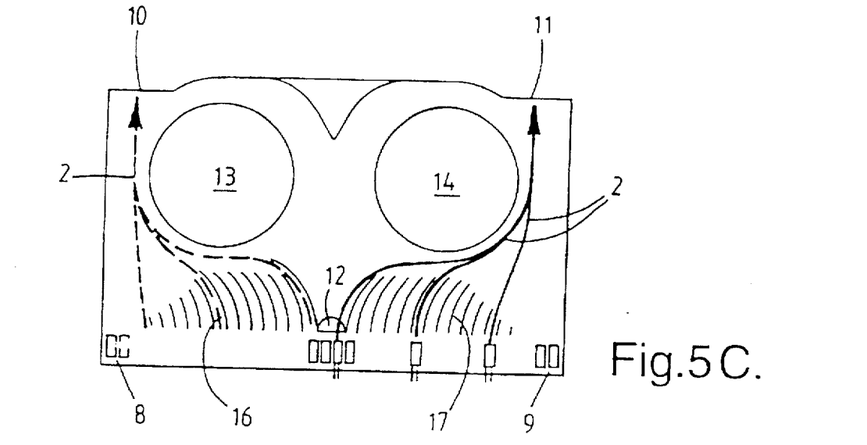

In FIG. 5C fibres enter through inlet ports 8 and leave through outlet port 10, and enter through inlet ports 9 and leave through outlet port 11.

Figure 5D:
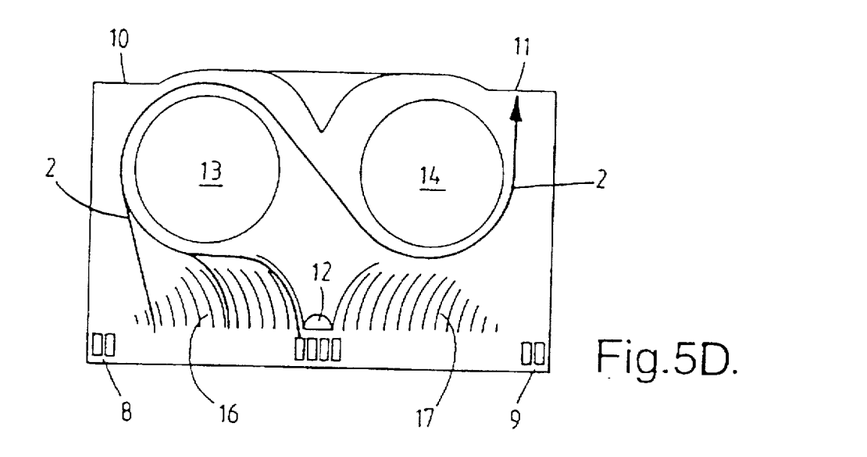

In FIG. 5D fibres enter through inlet ports 8 and leave through outlet port 11.

Figure 5E:
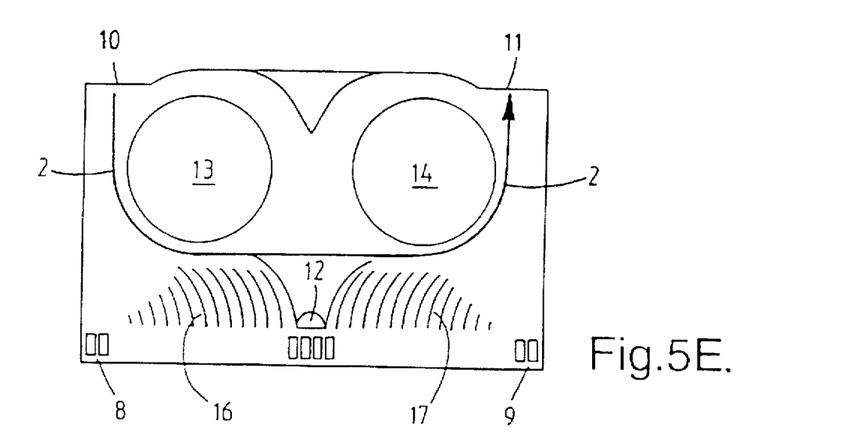
Figures 6A, 6B, 6C, 6D, 6E:
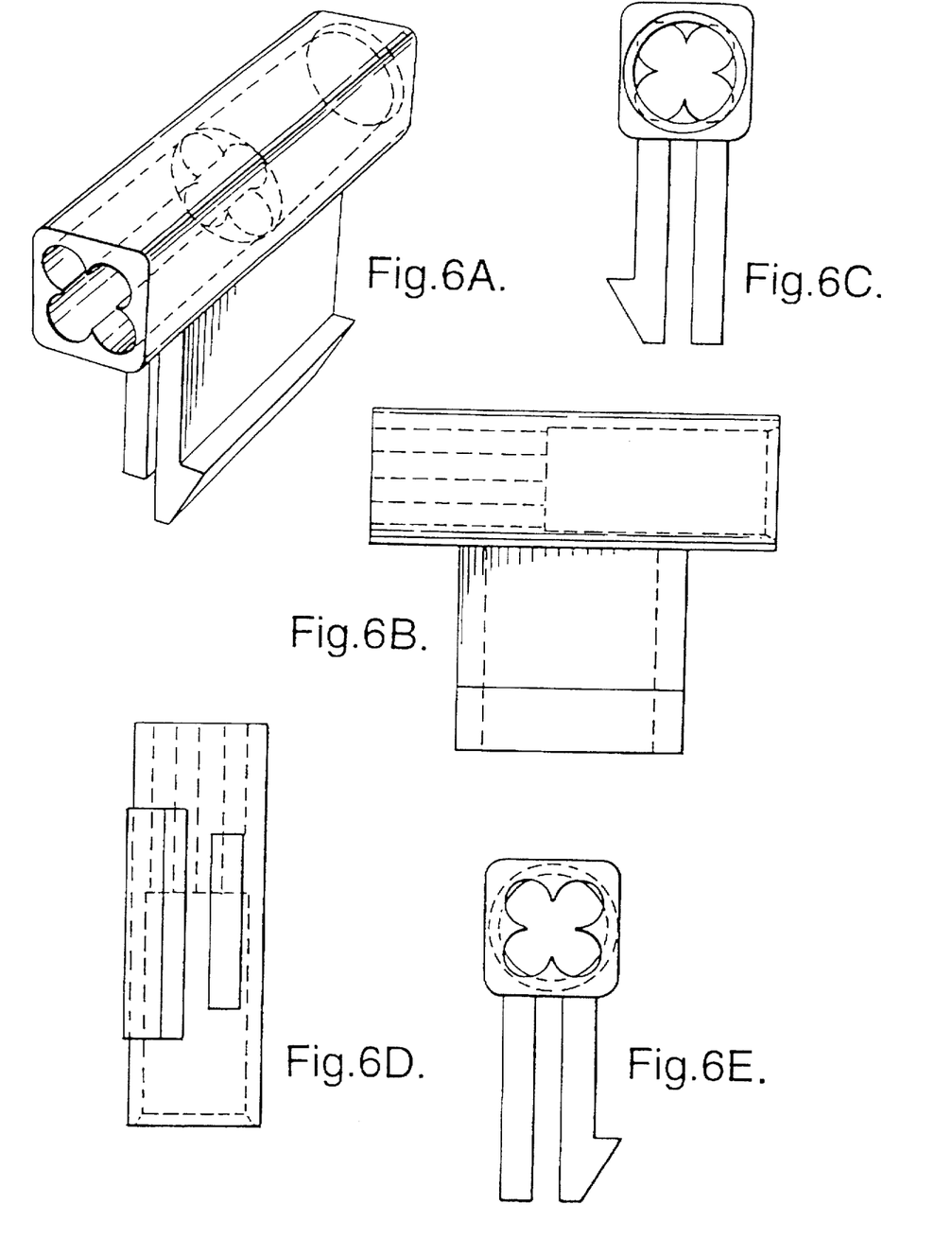
FIGS. 6A to E show an optical fibre break-out device.

In FIG. 5E fibres enter through outlet port 10 and leave through outlet port 11.

An optical fibre break-out device is shown in FIGS. 6A to E. It may be removably secured into, for example, the slots comprising the inlet ports 8, 9 of the organizer of FIG. 3. This can be done by means of a resilient detent comprising for example the two legs illustrated, one of which is barbed to engage a lower surface of the wall defining the slot. The break-out device can be seen to have a first passage for retaining a larger fibre tube (shown dotted at the upper right-hand side) and four second passages (at the lower left hand end as drawn) for retaining a plurality of smaller fibre tubes. Fibres in such tubes can be seen to be able to pass between the larger tube and each smaller tube without bending that would cause significant light loss. In the embodiment illustrated the four second passages comprise a single passage partially sub-divided by inwardly extending protrusions for retention of the tubes therein. The precise shape of such protrusions is not critical, but in a preferred embodiment the protrusions result from the second passages having a cross-section substantially that of a plurality of partially overlapping circles In this way, the tubes are retained by interference fit. Although four second passages are shown, other numbers for example from 2–6 may be provided.

Figure 7:
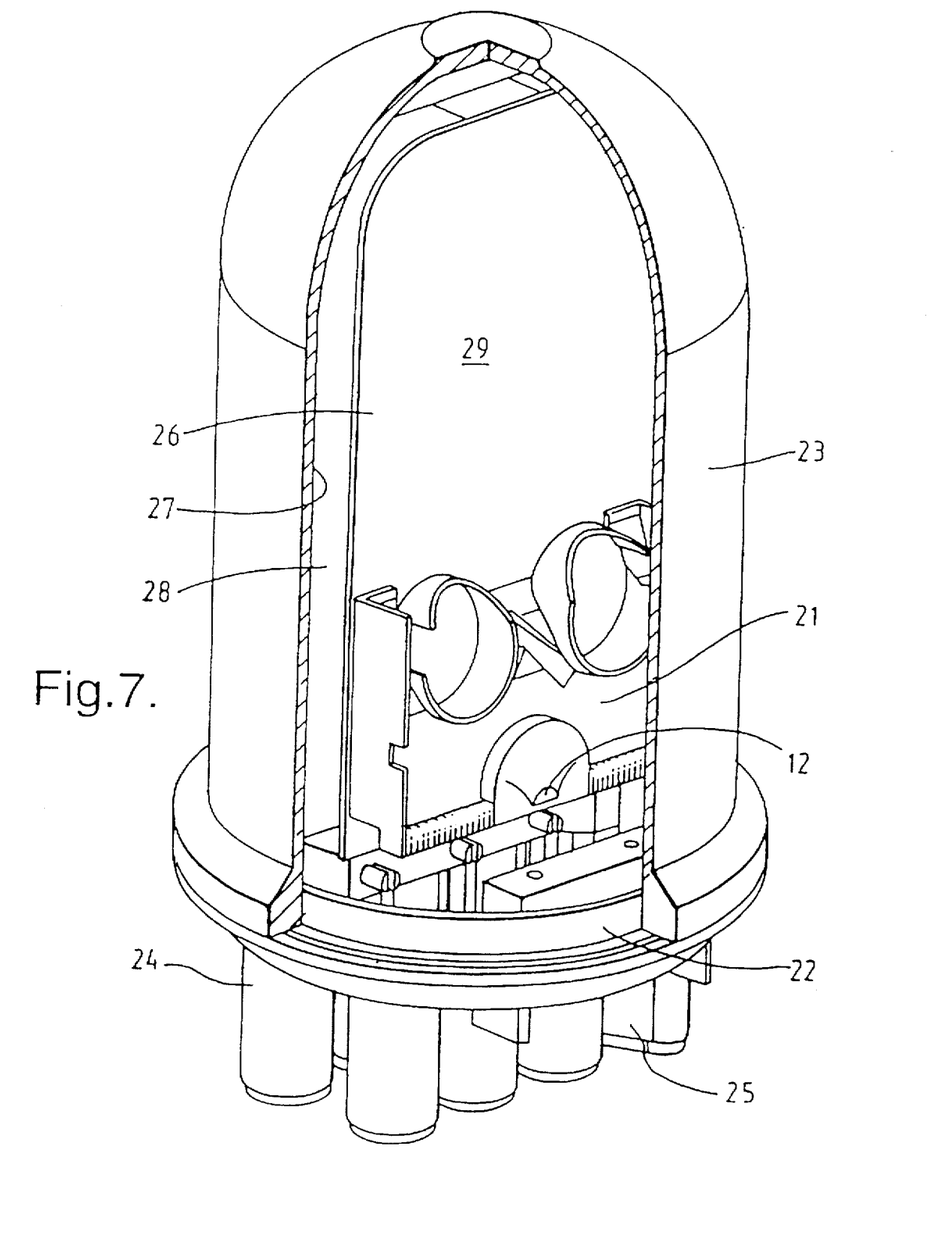
FIG. 7 shows a cable splice case incorporating the optical fibre organizer.

FIG. 7 shows an organizer 21 as described above sealed within a splice closure, shown in cut-away to expose the organizer 21. The splice closure comprises a base 22 and a dome-shaped cover 23. The base 22 carries various circular ports 24 and an oval port 25. Attached to the base is a frame or other support 26 to which the organizer 21 is attached. A second support or frame 27 is provided separated from frame or support 26 by a gap 28. This gap 28 may contain loops of fibre from incoming and outgoing cables that are not spliced within the enclosure and therefore by-pass organizer 21. A second organizer 21 may be provided on the back of the frame or support 27, and therefore out of view. The two organizers may then be in communication via their through holes 12. Organizer trays may be provided in space 29 carrying fibre splices and/or fibre splitters. Thus, cables entering the port 25 may be split such that some of the fibres they contain enter the organizer 21 as illustrated in FIGS. 5A to 5E, and may leave organizer 21 to splice trays positioned in space 29. There, the fibres will be spliced or split and the fibres to which they are spliced or into which they are split may re-enter the organizer 21 and finally leave it, again as shown in FIGS. 5A to 5E. Other fibres from the incoming cable may be looped in space 28 and then exit through the port. In general this will be done by taking a loop of cable of approximately two meters length which loop is inserted into oval port 25. Some of the fibres constituting that loop will simply be stored in space 28, and others will be cut and fed to the organizer 21. That loop of cable may form part of a ring or spur in a fibre optic network. The fibres leaving circular ports 24 after being spliced to the cut fibres of that loop may pass to subscribers or may be used to form a further spur.

Figure 8:
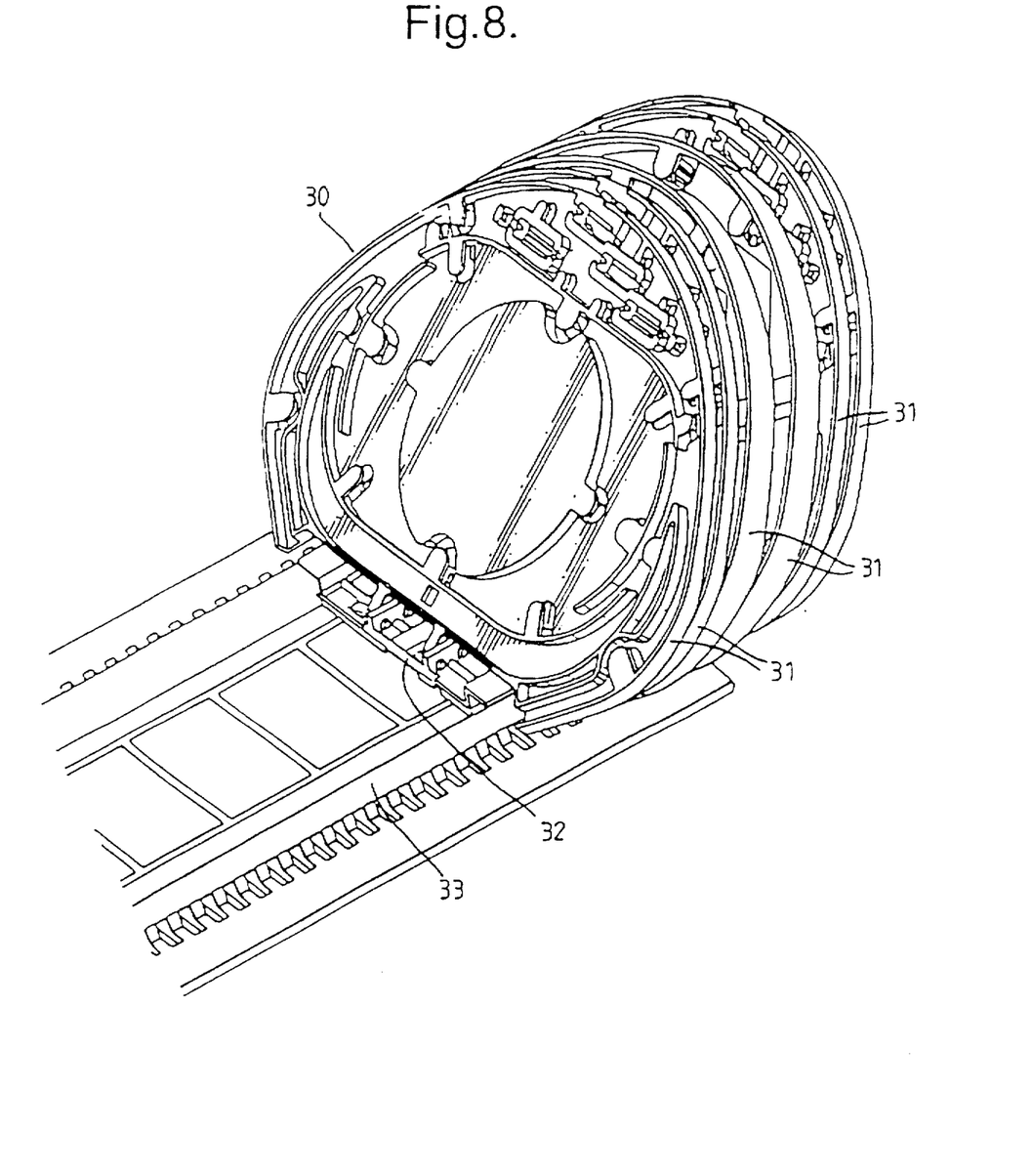
FIG. 8 shows a series of organizer trays for use with the organizer.

FIG. 8 illustrates optical fibre trays that may be positioned in space 29 or otherwise used in conjunction with organizer 21.

The module 30 illustrated in FIG. 8, which may be preinstalled with fibres, comprises a series of trays 31 hinged to a mounting device 32 which is in turn fixed to a base 33. The trays 31 can be seen to have means for storing loops of fibres and for securing fibre splices or fibre splitters. This module may be snap-fitted or otherwise attached at space 29 of FIG. 7 and the fibres it contains then spliced to those leaving the organizer 21.

For the avoidance of doubt it is noted that the invention provides various components, assemblies, systems and methods for organizing, storing and protecting optical fibres. Any of the various components disclosed may be used with any one or more other such components.

We claim:
1. An optical fibre organizer, which comprises:
 (i) a plurality of inlet ports through which optical fibres can pass;
 (ii) an outlet port through which optical fibres can pass;
 (iii) an organizer drum positioned with respect to the ports such that fibres passing from the inlet ports to the outlet port are constrained by an outer surface of the drum to a minimum bend radius at least equal to the critical bend radius of the fibres; and
 (iv) a base plate which carries a series of optical fibre splice trays for accommodating optical fibre splices between optical fibres exiting the outlet port and optical fibres contained on the splice trays;
 in which each inlet port has bend control means adjacent thereto to direct a fibre passing through that port towards the surface of the drum at a minimum bend radius at least equal to the critical bend radius of that fibre.

2. An organizer according to claim 1, having the outlet port at an opposite edge portion thereof to the inlet ports.

3. An organizer according to claim 1, having at least four inlet ports arranged in a row along an edge portion thereof.

4. An organizer according to claim 1, in which the several bend control means comprise substantially mutually concentric curved walls.

5. An organizer according to claim 1, having at least two outlet ports and at least two drums, the organizer being substantially symmetrical about a plane between the two drums.

6. An organizer according to claim 5, in which the several bend control means comprise substantially mutually concentric curved walls, walls on one side of said plane curving away from those on the opposite side of said plane.

7. An organizer according to claim 1 of unitary construction.

8. An organizer according to claim 1, in which the splice trays are hinged to a mounting device which is fixed to the base plate.

9. An organizer according to claim 1, in which the organizer drum is hollow allowing a free end of optical fibre to pass from a said inlet port or said outlet port to the interior of the drum and to be stored therein at a minimum bend radius greater than that at which it suffers permanent damage.

10. An organizer according to claim 1, which additionally comprises a port that extends through a face of the organizer, which face carries the inlet ports, the or each outlet port, and the or each organizer drum, to an opposite face of the organizer.

* * * * *

UNITED STATES PATENT AND TRADEMARK OFFICE
CERTIFICATE OF CORRECTION

PATENT NO.   : 5,764,843
DATED        : June 9, 1998
INVENTOR(S)  : Macken et al.

It is certified that error appears in the above-identified patent and that said Letters Patent is hereby corrected as shown below:

In column 1, line 7 replace "splicing" by --splitting--.

Signed and Sealed this

Tenth Day of November 1998

Attest:

BRUCE LEHMAN

*Attesting Officer*    *Commissioner of Patents and Trademarks*